Figure 1:
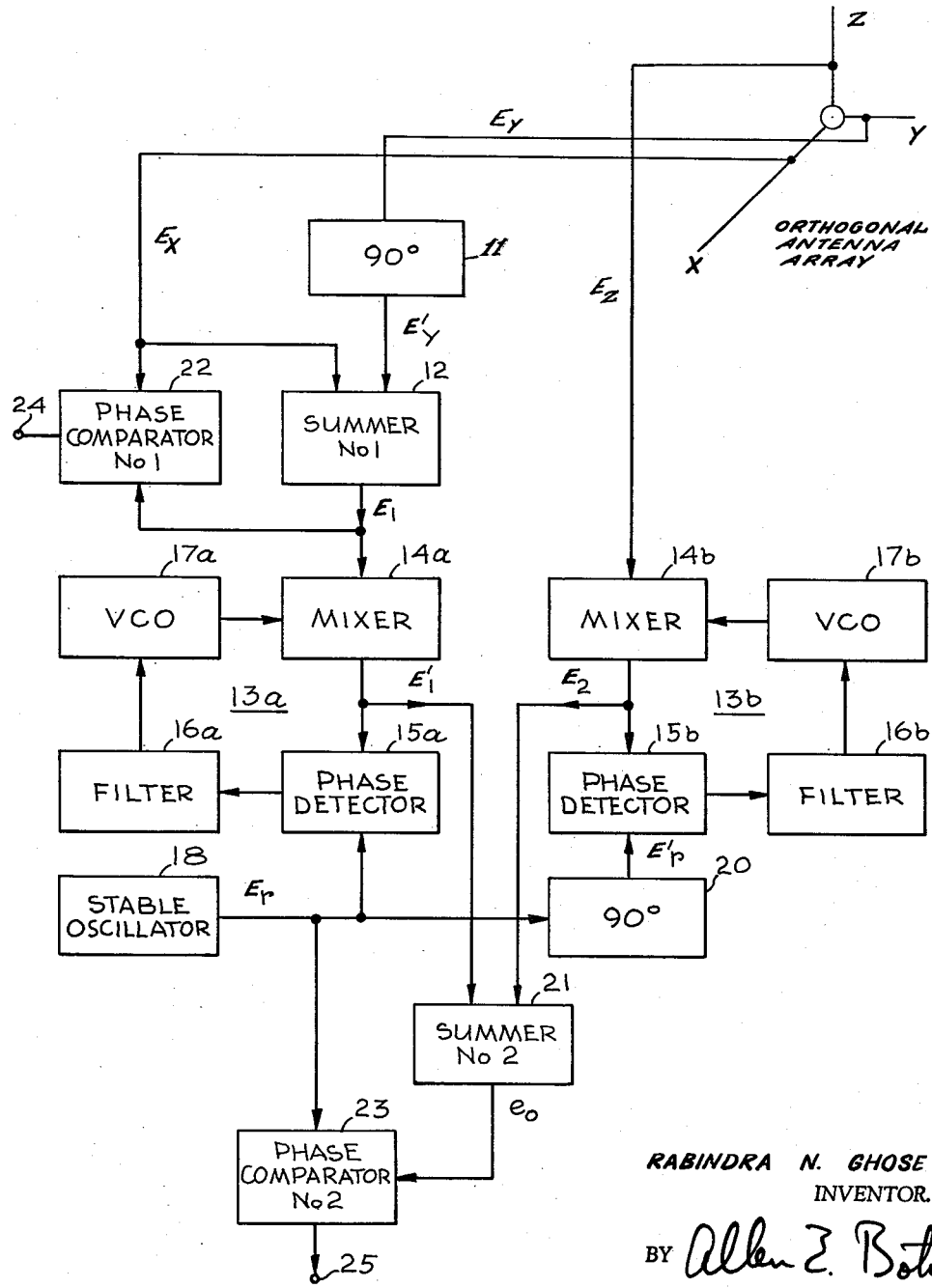

May 12, 1964      R. N. GHOSE      3,133,283
ATTITUDE-SENSING DEVICE

Filed Feb. 16, 1962      3 Sheets-Sheet 1

RABINDRA N. GHOSE
INVENTOR.

BY *Allen E. Botney*
ATTORNEY

May 12, 1964   R. N. GHOSE   3,133,283
ATTITUDE-SENSING DEVICE
Filed Feb. 16, 1962   3 Sheets-Sheet 2

RABINDRA N. GHOSE
INVENTOR.

BY *Allen E. Botney*

ATTORNEY though the present invention is not restricted to these applications, but can be utilized in any device requiring attitude sensing.

United States Patent Office 3,133,283
Patented May 12, 1964

3,133,283
ATTITUDE-SENSING DEVICE
Rabindra N. Ghose, Los Angeles, Calif., assignor to Space-General Corporation, Glendale, Calif.
Filed Feb. 16, 1962, Ser. No. 173,726
13 Claims. (Cl. 343—100)

The present invention relates in general to guidance systems and more particularly relates to electronic attitude-sensing apparatus.

Attitude-sensing may be necessary to provide terminal guidance for a space vehicle. Also, when radar and optical pictures of planetary or terrestrial objects are taken from a space vehicle, it is important to know its exact attitude or aspects at the time the pictures are taken so as to later permit proper evaluation of the information contained in the pictures. However, since a present day space vehicle is likely to tumble and spin in space or somehow become undesirably oriented, its attitude with respect to some inertial frame of reference would not normally be known at all times. Consequently, in the pursuance of space exploration, it is often desirable to have an attitude-sensing device at the space vehicle. The present invention provides an antenna system which, with appropriate auxiliary apparatus, can be utilized to determine fairly accurately the attitude of a space vehicle.

According to the basic concept of the invention, a signal from an earth station is transmitted to the space vehicle where the sensing apparatus is located, attitude-sensing being accomplished by unambiguously determining the direction-of-arrival of the incoming signal with respect to an inertial frame of reference also in the space vehicle. If the direction-of-arrival of the signal from a fixed point on earth is known for all orientations and aspects of the space vehicle without a pre-program phase correction device, the attitude or aspects of the space vehicle with respect to the inertial frame of reference can at all times be determined uniquely. The direction-of-arrival of the signal can be obtained by determining the directions of the electric and magnetic field vectors of the signal. In the alternative, direction-of-arrival can be obtained by determining the directions of two electric field vectors whose associated signals are not widely separated in frequency.

Any one of several different approaches may be used to ascertain the direction of the electric and magnetic field vectors. One particular embodiment includes three dipole antennas respectively positioned along the $x$, $y$ and $z$ axes of a three-dimensional orthogonal reference system so that an $xy$ plane is formed by the antennas along the $x$ and $y$ axes, an $xz$ plane is formed by the antennas along the $x$ and $z$ axes, and a $yz$ plane is formed by the antennas along the $y$ and $z$ axes. The embodiment further includes apparatus coupled to the three antennas for determining the direction from which an incoming signal is received relative to the abovesaid three planes, that is, apparatus capable of ascertaining the angles formed between the electric and magnetic field vectors associated with an incoming signal and the reference system axes. More specifically, the antenna positioned along the $y$ axis is coupled through a 90 degree phase-shifter circuit to a first summing circuit to which the antenna positioned along the $x$ axis is directly connected. The output from this first summing circuit is fed to a first phase-locked loop network as well as to a first phase-comparator circuit, the antenna positioned along the $x$ axis also feeding into the comparator circuit. The embodiment also includes a second phase-locked loop circuit to which the antenna positioned along the $z$ axis is directly connected and a second summing circuit to which the outputs from both phase-locked loop networks are applied, the resulting output from the second summing circuit being fed to a second phase-comparator circuit. The signal generated by a stable oscillator is also applied to this second comparator circuit. As a result of this arrangement, the two phase-comparator circuits respectively produce a pair of signals which correspond to or, stated differently, constitute a measure of the angles $\theta$ and $\phi$, where $\theta$ and $\phi$ are respectively the angle between the $z$ and $x$ axes and the electric field vector.

However, knowledge of $\theta$ and $\phi$ of the electric vector is not enough to unambiguously determine the direction of arrival of the incoming signal, since the ambiguity of the direction-of-arrival about the roll axis of the electric vector still exists. Accordingly, in addition, a set of magnetic dipoles or loop antennas are introduced to determine by a similar procedure the direction of the magnetic field vector of the incoming signal with respect to the same inertial frame of reference, the combined knowledge of the directions of both electric and magnetic field vectors being sufficient to uniquely determine the direction-of-arrival of the signal.

It will be recognized that by using standard error-detecting networks and servomechanism devices in combination with the apparatus of the present invention, a space vehicle may be returned to a predetermined course should it deviate from that course. It will also be recognized by those skilled in the electronics art that the use of loop antennas at the space vehicle can be avoided if two signals, whose electric field vectors are spatially at right angles to each other, are transmitted by the ground station at slightly different frequencies. If the frequencies of the two signals are not too widely separated, the same set of orthogonal antennas at the space vehicle can be used. In this case, the signals received at the satellite antennas can be separated out with filter ararngements and independently processed.

It is, therefore, an object of the present invention to provide an all-electronic attitude-sensing device.

It is another object of the present invention to provide a system by means of which the directions of the electric and magnetic field vectors of a signal may be determined.

It is a further object of the present invention to provide a system for continuously determining the direction-of-arrival of an incoming signal relative to a three-dimensional reference system irrespective of the orientation of the reference system.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 2:
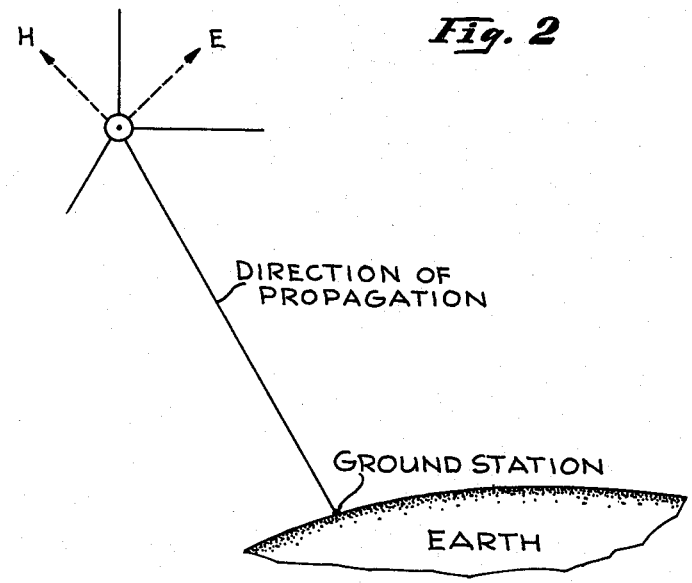

FIGURE 1 shows a block diagram of one embodiment of an attitude-sensing device according to the present invention;

FIGURE 2 presents a broad picture of the basic technique involved in the present invention.

Figure 3:
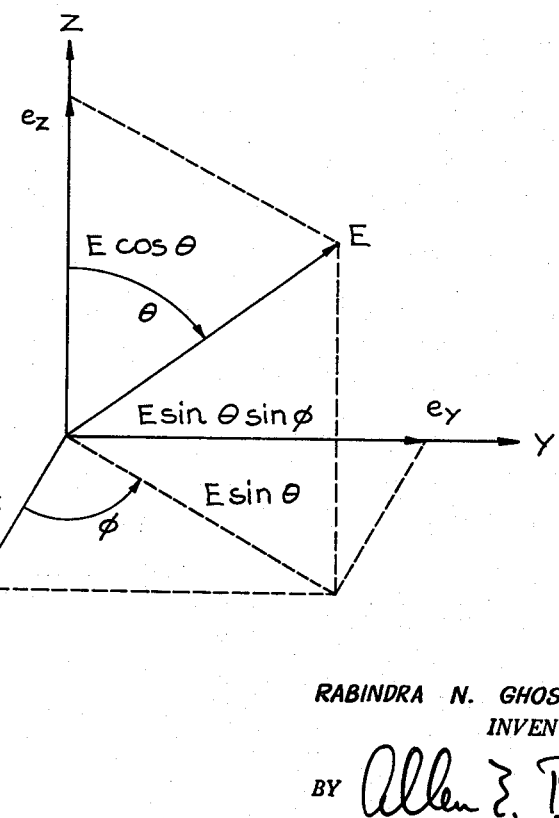
Figure 4:
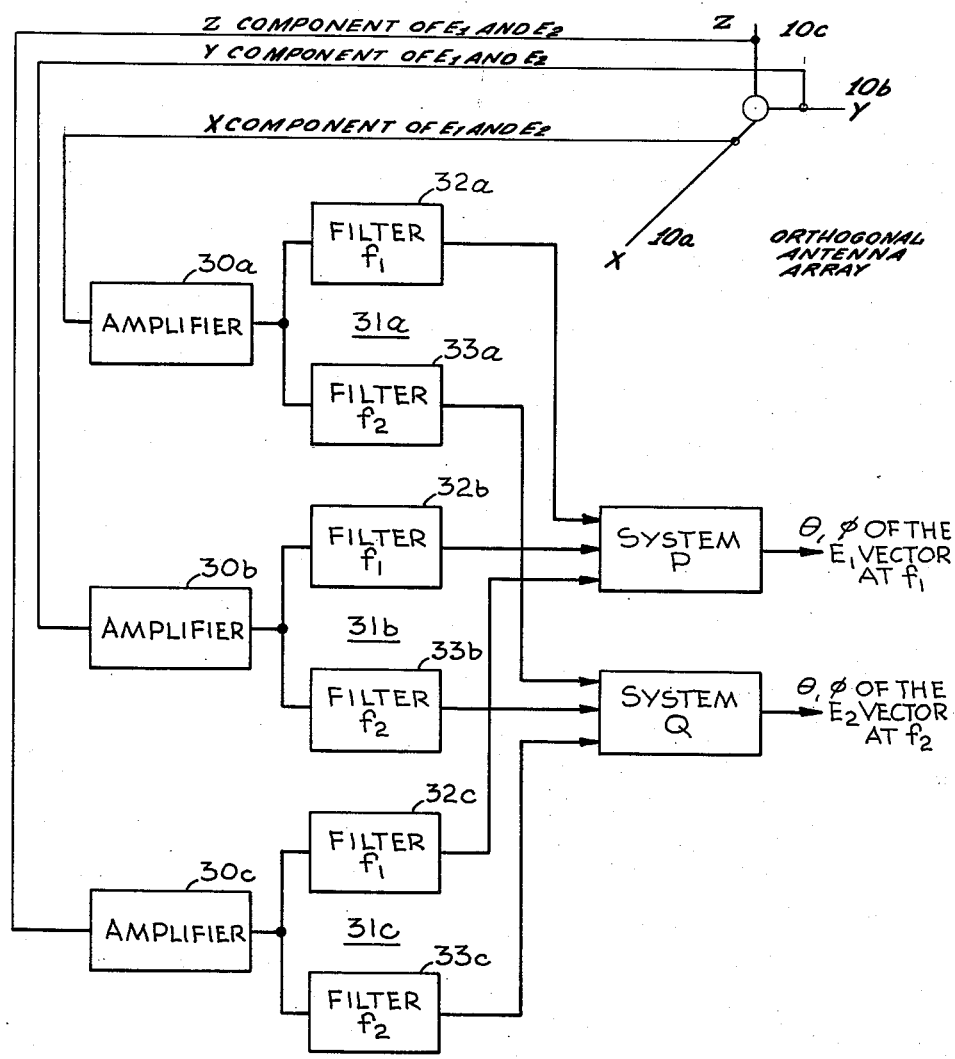

FIGURE 3 illustrates the components of an electric field vector incident upon a cartesian coordinate reference system; and FIGURE 4 shows an extension of the FIG. 1 embodiment for determining direction of propagation using two orthogonal electric vectors.

Considering now the drawings, reference is made to FIG. 1 wherein the embodiment is shown to include a plurality of three electric dipole antennas respectively designated 10a, 10b and 10c, the lengths of these antennas being very small compared to the wavelength of the incoming signal. Antennas 10a, 10b and 10c are respectively positioned on axes $x$, $y$ and $z$ and are oriented on these axes so that each antenna receives only its axial component of the incoming signal. Antenna 10b is coupled through a 90° phase-shifter circuit 11 to an adder or summer circuit 12. Antenna 10a, on the other hand, is connected directly to summer circuit 12. The function of circuit 11 is to shift the phase of signals applied to it by 90° timewise, that is, not spatially but in time. Another way of stating it is that circuit 11 produces a quarter wavelength delay in signals applied to it. The output of the summer circuit is connected to a phase-locked loop network which is generally designated 13a. With respect to antenna 10c, this antenna is connected to another phase-locked loop network generally designated 13b.

Phase-locked loop 13a includes a first mixer circuit 14a, a phase detector circuit 15a, a low-pass filter 16a and a voltage-controlled oscillator 17a, the elements mentioned being arranged to form a closed circuit or loop. More specifically, mixer 14a and phase detector 15a each have first and second input terminals, the first input to mixer 14a being connected to the output end of summer 12 and the first input to phase detector 15a being connected to the output end of the mixer. Lowpass filter 16a is coupled between the output end of phase detector 15a and voltage-controlled oscillator 17a, the output end of the oscillator being connected to the second input to mixer 14a. The phase-locked loop is thus formed. Phase-locked loop 13b is identical and, therefore, similarly includes a mixer circuit 14b, a phase-detector circuit 15b, a low-pass filter 16b and a voltage-controlled oscillator 17b, the circuit elements of this loop being interconnnected in exactly the identical manner as the elements of loop 13a. Consequently, to avoid redundancy, it is not deemed necessary to describe phase-locked loop 13b in any greater detail.

A very stable oscillator 18 is connected directly to the second input to phase detector 15a and through a second 90° phase shifter circuit 20 to the second input to phase detector 15b. The function of circuit 20 is the same as that of phase-shifter circuit 11, namely, to shift the phase of signals applied to it by 90° in time. Finally, the FIG. 1 apparatus includes a second summer circuit 21 and a pair of phase comparator circuits 22 and 23 which, as their names imply, compare the phases of signals applied to them, each phase comparator putting out a signal that is indicative of the phase difference between the signals applied to it. Phase comparator circuit 22 is connected across summer circuit 12 and, consequently, receives signals from the summer and antenna 10a. Phase-comparator circuit 23, on the other hand, is connected to the output ends of stable oscillator 18 and summer circuit 21 and, therefore, receives their signal outputs. The signals out of comparator circuits 22 and 23 are respectively applied to output terminals 24 and 25 which are also the output terminals for the entire apparatus. As for summer circuit 21, its two input lines are respectively connected to the output ends of mixers 14a and 14b so that summer 21 receives the signals from these mixers.

In considering the operation, it must first be mentioned that because the antennas are small in comparison with the wavelength of the incoming signal and, furthermore, because of the closeness to each other with which the antennas are positioned, the signals produced by the antennas are substantially in phase with each other timewise, that is to say, the x, y and z components of the incoming signal rise and fall together. However, generally speaking, the magnitudes of the three components differ from each other, the respective magnitudes being a function not only of the magnitude "E" of the incoming signal but also of the angles between the incoming signal and the antennas. Accordingly, as is illustrated in FIGS. 2 and 3, if a signal from a given point on earth is transmitted to a space vehicle in which the system of FIG. 1 is located, the components of the electric field respectively received by the orthogonal dipole antennas can be expressed as:

$$E_x = E \sin \theta \cos \phi \cos \omega t \quad (1)$$

$$E_y = E \sin \theta \sin \phi \cos \omega t \quad (2)$$

$$E_z = E \cos \theta \cos \omega t \quad (3)$$

where E is the electric field vector representing the incoming signal, E being the amplitude of the vector, and $\theta$ and $\phi$ are the polar and azimuth angles, respectively, of this vector, that is, $\theta$ is the angle between vector E and the z axis and $\phi$ is the angle between the projector of the vector on the xy plane and the x axis.

The signal from antenna 10b is passed through 90° phase shifter 11 so that a new signal $E'_y$ is obtained, namely, $$E'_y = E \sin \theta \sin \phi \cos \left(\omega t + \frac{\pi}{2}\right) \quad (4)$$

which, by trigonometric techniques, can be reduced to $$E'_y = -E \sin \theta \sin \phi \sin \omega t \quad (5)$$

Signals $E_x$ and $E'_y$ are then linearly combined in summer circuit 12 to yield an output signal $E_1$, where $$E_1 = E \sin \theta (\cos \phi \cos \omega t - \sin \phi \sin \omega t) \quad (6)$$

By trigonometric means, this equation may be reduced to $$E_1 = E \sin \theta \cos (\omega t + \phi) \quad (7)$$

Signal $E_1$ as well as signal $E_z$ out of antenna 10c are then respectively fed into identical phase-locked loops 13a and 13b. The signal from stable oscillator 18 is also fed into phase-locked loops 13a and 13b, the oscillator signal applied to loop 13a being $$E_r = E_0 \cos (\omega_0 t + \phi_0) \quad (8)$$

and the oscillator signal applied through 90° phase shifter 20 to loop 13b being $E'_r$, where $$E'_r = E_0 \cos \left(\omega_0 t + \phi_0 + \frac{\pi}{2}\right) \quad (9)$$

Equation 9 may be reduced to $$E'_r = -E_0 \sin (\omega_0 t + \phi_0) \quad (10)$$

The operation of phase locked loop networks are well understood and, hence, need not be described in detail here. Thus, the theory of networks of this type are set forth in an article entitled "Theory of AFC Synchronization," written by Wolf J. Gruen, and published on pages 1043–1048 of the August 1953 issue of the Proceedings of the I.R.E. Again, the lock-in characteristics of phase-locked loop networks are explained in article entitled "The Lock-In Performance of an AFC Circuit," written by G. W. Preston and J. C. Tellier, and published on pages 249–251 of the February 1953 issue of the Proceedings of the I.R.E. Suffice it to say, therefore, that since the criterion for the locking-in of a phase-locked loop is that the voltages into its phase detector must be at the same frequency and have a 90° relative phase shift (under these conditions, the error signal from the phase detector is zero), the output signals of the two phase-locked loops respectively become $$E'_1 = -KE \sin \theta \sin (\omega_0 t + \phi_0) \quad (11)$$

and $$E_2 = KE \cos \theta \cos (\omega_0 t + \phi_0) \quad (12)$$

where K is the effective gain of these identical phase-locked loops. The two signals $E'_1$ and $E_2$ are linearly combined in summer circuit 21 whose output, in response thereto, becomes $$E_0 = KE [\cos \theta \cos (\omega_0 t + \phi_0) - \sin \theta \sin (\omega_0 t + \phi_0)] \quad (13)$$

This equation for $E_0$ may trigonometrically be reduced to $$E_0 = KE \cos (\omega_0 t + \phi_0 + \theta) \quad (14)$$

It will be noted from this latter equation for $E_0$ that the absolute value of $E_0$ is a constant, that is to say $E_0 = KE$. Thus, the output from summer 21 is independent of the attitude of the space vehicle.

The angles $\theta$ and $\phi$ are now determined in the following manner. First, the azimuth angle $\phi$ is determined by measuring the relative phase between the signal $$E_1 = E \sin \theta \cos (\omega t + \phi) \quad (7)$$

and either of the signals $E_x$, $E_y$ or $E_z$. Similarly, the polar angle $\theta$ is determined by measuring the relative phase between the signal $$E_0 = KE \cos(\omega_0 t + \phi_0 + \theta) \qquad (14)$$

and the signal $$E_r = E_0 \cos(\omega_0 t + \phi_0) \qquad (8)$$

In the system of FIG. 1, signals $$E_1 = E \sin\theta \cos(\omega t + \phi) \qquad (7)$$

and $$E_x = E \sin\theta \cos\phi \cos\omega t \qquad (1)$$

are applied to phase-comparator circuit 22 and since the phase difference between these two signals is the angle $\phi$, the output signal produced at output terminal 24 reflects this phase difference, that is to say, the magnitude of the signal at terminal 24 is proportional to the azimuth angle $\phi$. In other words, $$E_{24} = K_1 f(\phi) \qquad (15)$$

where $E_{24}$ is the signal appearing at output terminal 24. In the same way, signals $$E_0 = KE \cos(\omega_0 t + \phi_0 + \theta) \qquad (14)$$

and $$E_r = E_0 \cos(\omega_0 t + \phi) \qquad (8)$$

are applied to phase-comparator circuit 23 and since the phase difference between $E_0$ and $E_r$ is the angle $\theta$, the output signal produced at output terminal 25 corresponds to this phase difference, that is, the magnitude of the signal developed at terminal 25 is proportional to the polar angle $\theta$. Stated differently, $$E_{25} = K_2 f(\theta) \qquad (16)$$

where $E_{25}$ is the signal appearing at output terminal 25.

Knowledge of angles $\theta$ and $\phi$ uniquely determines the direction of the electric field vector. However, as was mentioned previously, knowledge of $\theta$ and $\phi$ alone is not enough to unambiguously determine the direction-of-arrival of the incoming signal. In order to do so, it is necessary to also determine the direction of the magnetic field vector. Accordingly, for this purpose, the embodiment also includes a second arrangement of apparatus that is identical to the arrangement shown in FIG. 1, the only exception being that a set of three magnetic dipoles or loop antennass are substituted for electric dipoles 10a, 10b and 10c. In other words, the embodiment actually includes two of the combinations shown in FIG. 1, one such combination having three orthogonally arranged electric dipoles and the other having three orthogonally arranged magnetic dipoles or loop antennas, the combinations otherwise being identical. The two sets of antennas are positioned along the axes of their respective axial reference systems and as close together as possible so that the two reference systems involved will be substantially co-centered.

In its operation, the arrangement for determining the direction of the magnetic field vector is exactly the same as the arrangement shown in FIG. 1 for determining the direction of the electric field vector. Accordingly, to avoid being completely redundant, a complete description of its operation is omitted. Suffice it to say, therefore, that this second arrangement produces a pair of output signals $E'_{24}$ and $E'_{25}$ that are respectively functions of $\phi'$ and $\theta'$, that is $$E'_{24} = K'_1 f(\phi') \qquad (17)$$

and $$E'_{25} = K'_2 f(\theta') \qquad (18)$$

where $\phi'$ and $\theta'$ are respectively the azimuth and solar angles of the magnetic field vector. Thus, the direction of the magnetic vector is determined, the combined knowledge of the directions of both the electric and magnetic field vectors being adequate to determine the direction-of-arrival of the incoming signal and this information, when related to an inertial frame of reference, provides the desired attitude sensing.

As a matter of fact, it should be mentioned that because the two arrangements in the embodiment are identical both as to their construction and their operation, it was not deemed necessary that both be illustrated. Accordingly, as already mentioned, only one arrangement has been shown in FIG. 1, namely, the arrangement for determining the direction of the electric field vector.

The use of loop antennas at the space vehicle can be avoided if two signals are transmited by the ground station whose electric field vectors are spatially at right angles to each other. If the frequencies of the two signals are not widely separated, the same set of orthogonally arranged electric dipole antennas can be used, the signals received at the satellite antennas being separated or filtered out and independently processed by an arrangement shown schematically in FIG. 4 to which reference is now made.

As shown therein, the arrangement includes three electric dipole antennas 10a, 10b and 10c orthogonally arranged, as before, along the $x$, $y$ and $z$ axes of the reference system. The arrangement also includes two systems that are respectively designated P and Q, each of the systems comprising elements 11 through 25 of FIG. 1 in exactly the same combination. In other words, one combination of elements 11 through 25, adapted for a signal frequency $f_1$, constitutes system P and a second and identical combination of elements 11 through 25, adapted for a signal frequency $f_2$, constitutes system Q. As heretofore mentioned, frequencies $f_1$ and $f_2$ are preferably not widely separated. Three amplifiers, designated 30a, 30b and 30c, are respectively connected to antennas 10a, 10b and 10c and, finally, three pairs of filters, generally designated 31a, 31b and 31c, are coupled between amplifiers 30a, 30b and 30c and systems P and Q. Considering the filters with greater particularity, filter pair 31a includes filters 32a and 33a, filter pair 31b includes filters 32b and 33b, and filter pair 31c includes filters 32c and 33c. Filters 32a, 32b and 32c are designed to pass only the signal received at frequency $f_1$ and, consequently, they are connected between amplifiers 30a, 30b and 30c, respectively, and system P. Similarly, filters 33a, 33b, 33c are designed to pass only the signal received at frequency $f_2$ and, for this reason, they are connected between amplifiers 30a, 30b and 30c, respectively, and system Q. Thus, there are three separate and distinct inputs to system P and three separate and distinct inputs to system Q as well, the three inputs to each system being connected to the elements of that system in exactly the same manner as the three antennas in FIG. 1. Thus, by way of example, the three inputs to system P are connected to elements 11, 12, 14b and 22 therein, the three inputs to system Q being similarly connected to its elements 11, 12, 14b and 22.

With but slight differences, mainly due to the fact that two signals at slightly different frequencies are used, the operation of the FIG. 4 arrangement is substantially the same as that for the arrangement in FIG. 1. More specifically, the signal at frequency $f_1$ is intercepted by antennas 10a, 10b and 10c, with the result that the $x$, $y$ and $z$ components of this signal are applied to amplifiers 30a, 30b and 30c. After amplification, these $x$, $y$ and $z$ signal components are respectively applied to filter pairs 31a, 31b and 31c wherein they are rejected by filters 33a, 33b and 33c but passed by filters 32a, 32b and 32c to system P. It will be remembered that the internal arrangement of system P includes and operates the same as elements 11 through 25 in FIG. 1. Consequently, in response to the three signal components at frequency $f_1$, system P produces a pair of output signals that are respectively functions of $\theta$ and $\phi$ of the $E_1$ vector. In the same way, the $x$, $y$ and $z$ components of the signal at frequency $f_2$ are amplified by amplifiers 30a, 30b and 30c and thereafter passed through filters 33a, 33b and 33c to system Q. Since system Q is identical to system P except that system Q is adapted for frequency $f_2$, system Q produces a pair of output signals that are respectively functions of $\theta$ and $\phi$ of the $E_2$ vector.

Thus, the directions of vectors $E_1$ and $E_2$ associated with the two received signals are determined and this, in turn, determines the direction of the incoming signals, as previously mentioned and explained.

Although a number of particular arrangements of the invention have been illustrated above by way of example, it is not intended that the invention be limited thereto. Accordingly, the invention should be considered to include any and all equivalent modifications, alterations, or arrangements falling within the scope of the annexed claims.

Having thus described the invention, what is claimed as new is:

1. Electronic apparatus for continuously determining the direction of one of the field vectors, magnetic or electric, of an intercepted signal, said apparatus comprising: three antennas respectively positioned and oriented along the axes of a three-dimensional orthogonal system of reference for producing axial components of the intercepted signal; a first circuit coupled to one of said antennas for shifting the phase of the signal component therefrom by 90°; a second circuit coupled to said first circuit and to another of said antennas for adding the signal components therefrom to produce a first combined signal; a third circuit coupled to said other antenna and to said second circuit for comparing the phase difference between said first combined signal and the axial signal component from said other antenna, said third circuit producing a first output signal whose amplitude at any instant corresponds to said phase difference at that instant; means for generating a stable reference signal; a fourth circuit coupled to said means for shifting the phase of said reference signal by 90°; a first network coupled between said means and said second circuit, said first network being operable in response to said first combined and reference signals to produce a first intermediate-frequency signal that is in frequency and phase agreement with said reference signal; a second network coupled between the third of said antennas and said fourth circuit, said second network being operable in response to the axial signal component from said third antenna and the phase-shifted reference signal out of said fourth circuit to produce a second intermediate-frequency signal that is in frequency and phase agreement with said phase-shifted reference signal; a fifth circuit coupled to said first and second networks for adding the intermediate-frequency signals therefrom to produce a second combined signal; and a sixth circuit coupled to said means and to said fifth circuit for comparing the phase difference between said second combined signal and said second reference signal, said sixth circuit producing a second output signal whose amplitude at any instant corresponds to said phase difference at that instant.

2. The apparatus defined in claim 1 wherein said first and second networks are phase-lock loop networks.

3. Electronic apparatus for continuously determining the direction of one of the field vectors, magnetic or electric, of an intercepted signal, said apparatus comprising: three antennas respectively positioned and oriented along the axes of a three-dimensional orthogonal system of reference for producing axial components of the intercepted signal, said antennas being small compared to the wavelength of the intercepted signal and positioned close to the origin of the reference system; and means coupled to said three antennas for receiving said axial signal components, said means using said signal components to produce output signals whose magnitudes respectively correspond to the angles formed between a field vector of the intercepted signal and the axes of said reference system, said last means comprising a 90° phase shifter, means for linearly summing one of the axial components of a field vector with a second axial component after passage of one of said axial components through said phase shifter, means for phase comparing the output of said summing means with one of said axial components to produce one of said output signals, a reference frequency source, first and second phase-lock loop circuit means; means for introducing the reference frequency into said first and second phase-lock loop circuit means 90° out of phase, means introducing the third axial vector component into one of said phase-lock loop circuit means to produce a first intermediate frequency signal in fixed frequency and phase relationship with said reference frequency, means introducing the first and second axial component output of said summing means into the other of said phase-lock loop circuit means to produce a second intermediate frequency signal in fixed frequency and 90° phase shifted relationship with the reference, means for linearly summing the first and second intermediate frequency output of said first and second phase-lock loop means, and means for phase comparing the output of said last linear summing means with said reference frequency to produce a second output signal.

4. Electronic apparatus for continuously determining the direction of one of the field vectors, magnetic or electric, of an intercepted signal, said apparatus comprising: three antennas respectively positioned and oriented along the $x$, $y$ and $z$ axes of a three-dimensional orthogonal system of reference, said antennas being small compared to the wavelength of the intercepted signal and positioned close to the origin of the reference system, said antennas producing axial signal components $s_1$, $s_2$ and $s_3$ that are respectively, $A \sin \theta \cos \phi \cos \omega t$, $A \sin \theta \sin \phi \cos \omega t$, and $A \cos \theta \cos \omega t$, where A is the magnitude and $\theta$ and $\phi$ are repectively the polar and azimuth angles of the field vector corresponding to the intercepted signal; first means for processing and combining signal components $s_1$ and $s_2$ in such a manner as to produce a signal $s_4$ equal to $K_1 \sin \theta \cos (\omega t + \phi)$; a stable oscillator for generating a signal $s_5$ equal to $B \cos (\omega_0 t + \phi_0)$, where B is the amplitude of signal $s_5$, $\omega_0$ its frequency and $\phi_0$ an arbitrary phase angle; second means for processing and combining signals $s_3$, $s_4$ and $s_5$ in such a manner as to produce a signal $s_6$ equal to $K_2 \cos (\omega_0 t + \phi_0 + \theta)$; a first phase-comparator circuit receptive of signals $s$, and $s_4$ and operable in response thereto to produce a first output signal $E_1$ whose amplitude is a function of $\phi$; and a second phase-comparator circuit receptive of signals $s_5$ and $s_6$ and operable in response thereto to produce a second output signal $E_2$ whose amplitude is a function of $\theta$.

5. The apparatus defined in claim 4 wherein said first means includes a phase-shifter circuit for shifting the phase of signal $s_2$ by 90° to produce a signal $s'_2$ equal to $A \sin \theta \sin \phi \sin \omega t$; and a summer circuit for linearly adding signals $s_1$ and $s'_2$ to produce signal $s_4$.

6. The apparatus defined in claim 4 wherein said second means includes a phase-shifter circuit for shifting the phase of signal $s_5$ by 90° to produce a signal $s'_5$ equal to $$B \cos \left( \omega_0 t + \phi_0 + \frac{\pi}{2} \right)$$

a first phase-lock loop network receptive of signals $s_3$ and $s'_5$ and operable in response thereto to produce a signal $s_a$ equal to $C \sin \theta \sin (\omega_0 t + \phi_0)$; a second phase-lock loop network receptive of signals $s_4$ and $s_5$ and operable in response thereto to produce a signal $s_b$ equal to $D \cos \theta \cos (\omega_0 t + \phi_0)$; and a summer circuit for linearly adding signals $s_a$ and $s_b$ to produce signal $s_6$.

7. The apparatus defined in claim 4 wherein said first means include a first phase-shifter circuit for shifting the phase of signal $s_2$ by 90° to produce a signal $s'_2$ equal to $A \sin \theta \sin \phi \sin \omega t$, and a first summer circuit for linearly adding signals $s_1$ and $s'_2$ to produce signal $s_4$; and said second means includes a second phase-shifter circuit for shifting the phase of signal $s_5$ by 90° to produce a signal $s'_5$ equal to $$B \cos \left( \omega_0 t + \phi_0 + \frac{\pi}{2} \right)$$

a first phase-lock loop network receptive of signals $s_3$ and $s'_5$ and operable in response thereto to produce a signal $s_a$ equal to $C \sin \theta \sin (\omega_0 t + \phi_0)$, a second phase-lock loop network receptive of signals $s_4$ and $s_5$ and operable in response thereto to produce a signal $s_b$ equal to $D \cos \theta \cos (\omega_0 t + \phi_0)$, and a summer circuit for linearly adding signals $s_a$ and $s_b$ to produce signal $s_6$.

8. Electronic apparatus for continuously sensing the attitude of a vehicle by continuously determining the direction of arrival of an incoming signal, said apparatus comprising: three dipole antennas respectively positioned and oriented along the axes of a three-dimensional orthogonal system of reference for producing axial signal components corresponding to the electric field associated with the intercepted incoming signal, said antennas being small compared to the wavelength of the intercepted signal and positioned close to the origin of the reference system; means coupled to said three dipole antennas for receiving said axial signal components, said means using said signal components to produce output signals whose magnitudes are a function of the angles formed between the electric field vector of the intercepted incoming signal and the axes of said reference system; three loop antennas respectively positioned and oriented along the axis of an additional three-dimensional orthogonal system of reference for producing axial signal components corresponding to the magnetic field associated with the intercepted incoming signal, said antennas being small compared to the wavelength of the intercepted signal and positioned close to the origin of said additional reference system; and additional means coupled to said three loop antennas for receiving the axial signal components therefrom, said additional means using said signal components to produce additional output signals whose magnitudes are a function of the angles formed between the magnetic field vector of the intercepted signal and the axes of said additional reference system, whereby the direction of the magnetic field vector is determined.

9. Electronic apparatus for continuously sensing the attitude of a vehicle by continuously determining the direction of arrival of an incoming signal, said apparatus comprising: three dipole antennas respectively positioned and oriented along the axes of a first three-dimensional orthogonal system of reference for producing axial signal components corresponding to the electric field associated with the intercepted incoming signal, said dipole antennas being small compared to the wavelength of the intercepted signal and positioned close to the origin of said first reference system; a first circuit coupled to one of said dipole antennas for shifting the phase of the signal component therefrom by 90°; a second circuit coupled to said first circuit and to another of said dipole antennas for adding the signal components therefrom to produce a first combined signal; means for generating a stable reference signal; a third circuit coupled to said means for shifting the phase of said reference signal by 90°; a fourth circuit coupled between said means and said second circuit, said fourth circuit being operable in response to said first combined and reference signals to produce a first intermediate-frequency signal that is in frequency and phase agreement with said reference signal; a fifth circuit coupled between the third of said dipole antennas and said third circuit, said fifth circuit being operable in response to the axial signal component from said third dipole antenna and the phase-shifted reference signal out of said third circuit to produce a second intermediate-frequency signal that is in frequency and phase agreement with said phase-shifted reference signal; a sixth circuit coupled to said fourth and fifth circuits for adding the first and second intermediate-frequency signals therefrom to produce a second combined signal; a seventh circuit coupled to said other dipole antenna and to said second circuit for comparing the phase difference between said first combined signal and the axial signal component from said other dipole antenna and an eighth circuit coupled to said means and to said sixth circuit for comparing the phase difference between said second combined signal and said reference signal, said seventh and eighth circuits respectively producing first and second output signals whose amplitudes at any instant correspond to said phase differences at that instant, whereby the direction of the electric field vector is determined; three loop antennas respectively positioned and oriented along the axes of a second three-dimensional orthogonal system of reference for producing axial signal components corresponding to the magnetic field associated with the intercepted incoming signal, said antennas being small compared to the wavelength of the intercepted signal and positioned close to the origin of said second reference system; a first network coupled to one of said loop antennas for shifting the phase of the signal component therefrom by 90°; a second network coupled to said first network and to another of said loop antennas for adding the signal components therefrom to produce a third combined signal; a third network coupled between said means and said second network, said third network being operable in response to said third combined and reference signals to produce a third intermediate-frequency signal that is in frequency and phase agreement with said reference signal; a fourth network coupled between the third of said loop antennas and said third circuit, said fourth network being operable in response to the axial signal component from said third loop antenna and the phase-shifted reference signal out of said third circuit to produce a fourth intermediate-frequency signal that is in frequency and phase agreement with said third and fourth reference signal; a fifth network coupled to said third and fourth networks for adding the third and fourth intermediate-frequency signals therefrom to produce a fourth combined signal; a sixth network coupled to said other loop antenna and to said second network for comparing the phase difference between said third combined signal and the axial signal component from said other loop antenna and a seventh network coupled to said means and to said fifth network for comparing the phase difference between said fourth combined signal and said reference signal, said sixth and seventh networks respectively producing third and fourth output signals whose amplitudes at any instant correspond to said phase difference at that instant, whereby the direction of the magnetic field vector is determined.

10. Apparatus for continuously sensing the attitude of a vehicle in response to a pair of signals transmitted thereto at slightly different frequencies, said apparatus comprising: three antennas respectively positioned and oriented along the axes of a three-dimensional orthogonal system of reference in order to produce axial components of the electric fields associated with the incoming pair of signals, said antennas being small compared to the wavelength of the incoming signals and positioned close to the origin of said reference system; means coupled to said three antennas for separating the axial components obtained from one of the two incoming signals from the axial components obtained from the other of the incoming signals; first and second systems coupled to said second systems coupled to said means in order to respectively receive the axial components from the two incoming signals, said first and second systems using said axial components to respectively produce output signals that indicate the directions of the electric field vectors associated with the incoming signals, whereby the direction from which the signals are received at the vehicle are known.

11. The apparatus defined in claim 10 wherein said means includes a first set of three filters respectively coupled to said three antennas and tuned to one frequency of the incoming signals, and a second set of three filters respectively coupled to said three antennas and tuned to the other frequency of the incoming signals, whereby two distinct sets of axial signal components are produced.

12. The apparatus defined in claim 11 wherein said first and second systems are respectively coupled to said first and second set of filters, each of said systems including a first circuit coupled to one of the associated filters for shifting the phase of the axial signal component therefrom by 90°; a second circuit coupled to said first circuit and to another of the associated filters for adding the signal components therefrom to produce a first combined signal; a third circuit coupled to said other filter and to said second circuit for comparing the phase difference between said first combined signal and the axial signal component from said other filter, said third circuit producing a first output signal whose amplitude at any instant corresponds to said phase difference at that instant; means for generating a stable reference signal; a fourth circuit coupled to said means for shifting the phase of said reference signal by 90°; a first network coupled between said means and said second circuit, said first network being operable in response to said first combined and reference signals to produce a first intermediate-frequency signal that is in frequency and phase agreement with said reference signal; a second network coupled between the third of the associated filters and said fourth circuit, said second network being operable in response to the axial signal component from said third filter and the phase-shifted reference signal out of said fourth circuit to produce a second intermediate-frequency signal that is in frequency and phase agreement with said phase-shifted reference signal; a fifth circuit coupled to said first and second networks for adding the intermediate-frequency signals therefrom to produce a second combined signal; and a sixth circuit coupled to said means and to said fifth circuit for comparing the phase difference between said second combined signal and said reference signal, said sixth circuit producing a second output signal whose amplitude at any instant corresponds to said phase difference at that instant.

13. The apparatus defined in claim 12 wherein said first and second networks are phase-lock loop networks.

References Cited in the file of this patent

FOREIGN PATENTS 828,150     Great Britain _____ Feb. 17, 1960